United States Patent
Warner et al.

(10) Patent No.: US 8,258,927 B1
(45) Date of Patent: Sep. 4, 2012

(54) METHOD AND SYSTEM FOR INVENTORYING WIRELESS TRANSPONDERS PROVIDING ANTI-EAVESDROPPING ANTI-COLLISION

(75) Inventors: Robert Warner, Holmdel, NJ (US); Jack Winters, Middletown, NJ (US)

(73) Assignee: Eigent Technologies, Inc., Holmdel, NJ (US)

( * ) Notice: Subject to any disclaimer, the term of this patent is extended or adjusted under 35 U.S.C. 154(b) by 1147 days.

(21) Appl. No.: 12/079,826

(22) Filed: Mar. 28, 2008

Related U.S. Application Data

(60) Provisional application No. 60/922,209, filed on Apr. 6, 2007.

(51) Int. Cl.
*H04Q 5/22* (2006.01)
(52) U.S. Cl. ........................ 340/10.2
(58) Field of Classification Search ........ 340/572.1, 340/10.2; 380/46; 714/768; 705/16; 726/2; 701/200
See application file for complete search history.

(56) References Cited

U.S. PATENT DOCUMENTS

| | | | |
|---|---|---|---|
| 5,640,151 A | 6/1997 | Reis et al. | |
| 5,686,902 A | 11/1997 | Reis et al. | |
| 6,002,344 A | 12/1999 | Bandy et al. | |
| 6,130,623 A * | 10/2000 | MacLellan et al. | 340/5.1 |
| 7,009,518 B2 * | 3/2006 | Liao et al. | 340/572.1 |
| 7,415,720 B2 * | 8/2008 | Jung | 726/2 |
| 7,626,503 B2 * | 12/2009 | Choi et al. | 340/572.1 |
| 7,689,891 B2 * | 3/2010 | Bell et al. | 714/768 |
| 7,734,046 B2 * | 6/2010 | Urban et al. | 380/46 |
| 7,925,535 B2 * | 4/2011 | Beenau et al. | 705/16 |

FOREIGN PATENT DOCUMENTS
EP 0467036 A2 1/1992
* cited by examiner

*Primary Examiner* — Jennifer Mehmood
*Assistant Examiner* — Kaleria Knox
(74) *Attorney, Agent, or Firm* — Porzio, Bromberg & Newman, P.C.

(57) ABSTRACT

The present invention provides one or more powered wireless transponders and/or one or more passive wireless transponder devices communicating with a reader/interrogator and the method of efficiently inventorying these devices without the risk of eavesdropping. A reader transmits a random number and transponders generate their own random number. The transponders whose random number matches all or a part of the random number responds. If a collision occurs, the reader's random number can be changed and retransmitted until almost one transponder response is verified in a tree search algorithm. Specifically, the invention concerns a method for inventorying wireless transponders providing anti-eavesdropping anti-collision.

20 Claims, 3 Drawing Sheets

# METHOD AND SYSTEM FOR INVENTORYING WIRELESS TRANSPONDERS PROVIDING ANTI-EAVESDROPPING ANTI-COLLISION

CROSS REFERENCE TO RELATED APPLICATION

This application claims the benefit of U.S. Provisional Patent Application No. 60/922,209 filed Apr. 6, 2007, the entirety of which is hereby incorporated by reference into this application.

BACKGROUND OF THE INVENTION

1. Field of the Invention

The present invention provides a system and method including one or more powered wireless transponders and/or one or more passive wireless transponder devices communicating with a reader/interrogator in which the devices are efficiently inventoried without the risk of eavesdropping.

2. Description of Related Art

A conventional wireless transponder system includes a reader plus a number of wireless transponders, such as radio frequency identification (RFID) transponders. In such a system, the reader needs to identify the transponders within communication range before transmitting commands, either broadcasted to all transponders or to the individual transponders. An anti-collision technique to inventory transponders is described in the ISO 18000-7 standard which is described as follows. First the reader/interrogator sends a wakeup signal to place all transponders in a ready state. An interrogator initiates the tag collection process by sending a Collection command. Transponders receiving a Collection command randomly select a slot in which to respond, but the transponders do not immediately start transmitting. The number of slots in a current collection round is determined by the interrogator command type. Each Collection command requires specific type and amount of data to be transmitted by the tag within a single slot time. The initial window size is fixed and set to 57.3 ms. During the subsequent collision arbitration process, the interrogator dynamically chooses an optimum window size for the next collection round based on the number of collisions in the round. The number of collisions is a function of the number of transponders present within the interrogator communication range that participate in the current collection round. Upon receiving a Collection command, the transponders select a slot in which to respond. The selection is determined by a pseudo-random number generator. When a tag selects a slot_number the tag waits for a pseudo-random time delay equal to a time of slot_number multiplied by slot_delay before it responds. The number of slots is determined by the current window size, indicated through the interrogator collection command type and a tag transmission time. This process is repeated until all transponders respond, specifically until three consecutive collection rounds occur without any tag responses. The technique used in ISO 18000-7 is described in a number of patents, including U.S. Pat. Nos. 5,686,902, 5,640,151 and 6,002,344 and European Patent No. 04607036, all of which cover specific aspects of the ISO 18000-7 technique.

According to the ISO 18000-7 standard and the corresponding patents, when a tag responds, the response packet contains the tag ID, which is permanently assigned to each tag on manufacture. The use of a permanently assigned tag has many disadvantages including that the tag ID is readily available to be read by an eavesdropper, and an unauthorized reader can determine which tagged items are within range. Furthermore, the collection technique can be inefficient in that the window size for collection is initially fixed and the technique requires all transponders to respond after each collection command.

It is desirable to provide an improved anti-eavesdropping anti-collision technique without the risk of eavesdropping.

SUMMARY OF THE INVENTION

The present invention provides a method and system for inventorying wireless transponders providing anti-eavesdropping anti-collision in which a reader transmits a random number and transponders that individually generate their own random numbers. The transponders whose random number matches all or part of the transmitted random number responds. Furthermore, those transponders responding transmit only the random number or acknowledgement back to the reader, such that neither an eavesdropper nor an unauthorized reader can track items through a conventional tag ID.

The method of the present invention does not require the conventional time-consuming acknowledgement of the collection of tag ID's by the reader and the transponders and it does not have the transponders responding once each of the transponders have been identified (by their random numbers), since that random number is not transmitted again. In this manner, an eavesdropper sees only random numbers being transmitted and an unauthorized reader sees at most random numbers transmitted to it.

The invention will be more fully described by reference to the following drawings.

DETAILED DESCRIPTION

Figure 1:
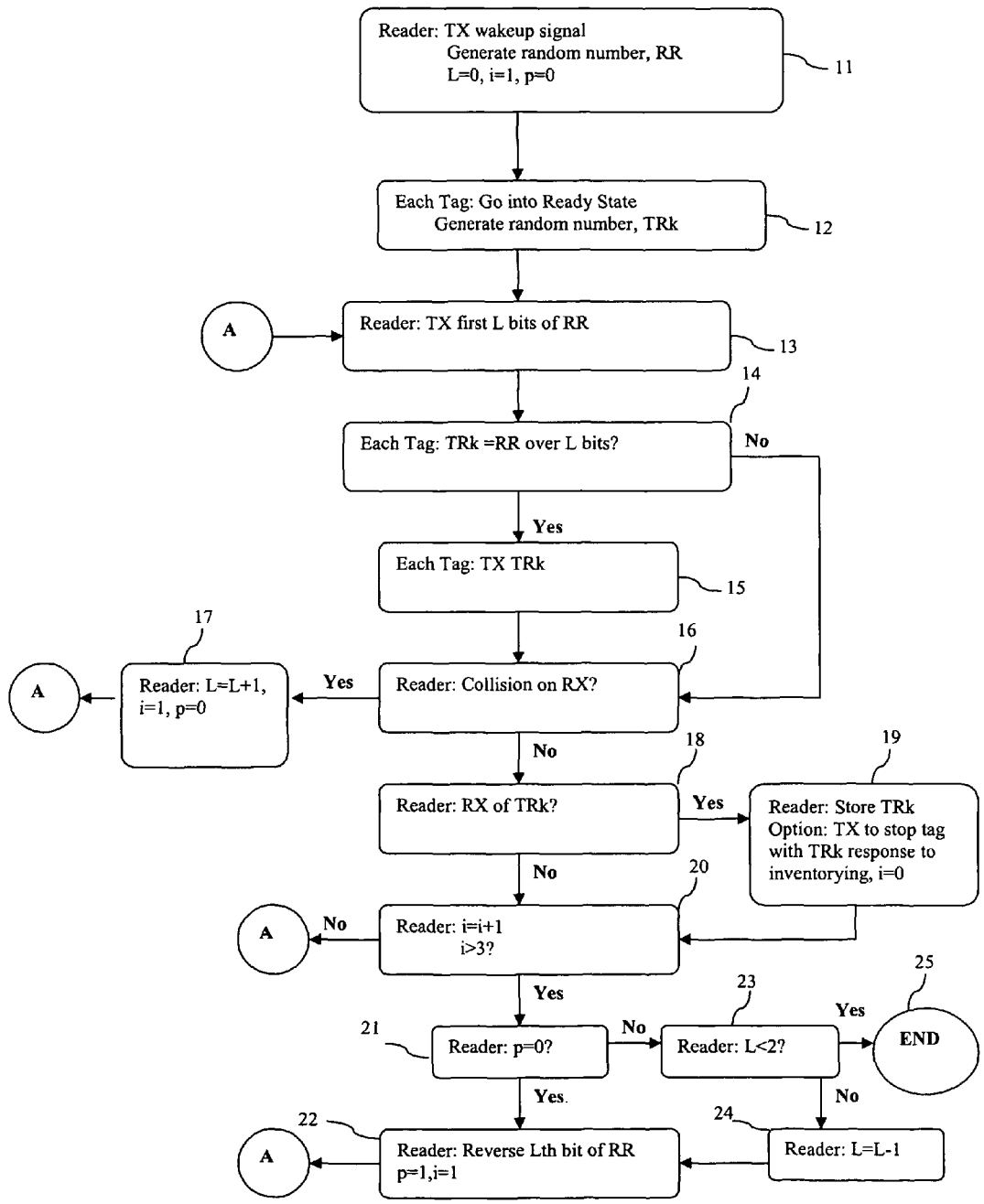
FIG. 1 is a flow diagram of a method for inventorying wireless transponders providing anti-eavesdropping anti-collision.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a flow diagram of the method for inventorying wireless transponders providing anti-eavesdropping anti-collision 10 in accordance with the teachings of the present invention. In block 11, a reader sends a wakeup signal to place all transponders into the Ready state. The reader generates reader random number RR. In block 12, each transponder goes into a Ready State and the transponder generates transponder random number TRk. The length of the transponder random number TRk is the same for all transponders and is predetermined based on the maximum number of transponders that a reader would need to interrogate. The length of the reader random number RR is based on the fraction of the transponders that it wants to respond to its collection command. For example, if the transponder random number length was set to 32 bits, then up to 1000 transponders could be collected with the probability of any two transponders having the same random number equal to $10^{}-6$. And if the length of the reader random number is x bits, then on average only one out of 2x transponders should respond to each collection command.

In block 13, the reader transmits its reader random number RR to the transponders. In block 14, the transponders compare the reader random number RR to the transponder random number TRk that they have generated. If the two random numbers match over a portion or the length of the reader random number RR, the transponders respond by transmitting their transponder random number TRk to the reader, in block 15. Alternatively, an acknowledgement signal with no information can be sent if the two random numbers match over a portion or the length of the reader random number (TRk=RR). If the transponder random number TRk does not match the reader random number RR, in block 14, the method proceeds to block 16.

In block 16, the reader determines if a collision occurred by multiple transponders responding to the reader random number RR. Initially, the reader random number RR can have a length L set to 0, in block 14. If collisions occur from multiple transponders responding, then the reader can increase the length L of the reader random number RR by one bit, in block 17, and repeat the process from block 13 until no collisions occur.

In block 18, if no collisions occur or are detected and if the reader received the transponder random number TRk, the reader stores the transponder random number TRk in block 19. Since a collision may not have been detected even if there were multiple tags responding, for example, due to one tag's signal being much stronger than another, one option is for the reader to send a message for the tag with response TRk to stop responding to the inventorying, set the repeat index i to 0, and repeat the process by proceeding to block 20. In block 20, if no response is received, or when only one tag response is detected, the reader can resend the reader random number a given number of times to verify by increasing the counter i by returning to block 13, and repeating the process from block 13. For example, repeating two times provides the same reliability as ISO 18000-7.

After repeating the above process, for example, two times as described above, the reader checks to see if the $L^{th}$ bit of reader random number RR has been previously reversed (p=0 if it has not, and p=1 if it has) in block 21. If the last bit has been reversed, in block 23 the reader checks if the length L of the reader random number RR is less than 2. If it is, then all tags have been inventoried, and the inventorying process is ended in block 25. If not, the reader decreases length L by one in block 24 and proceeds to block 22, which is also the block that follows block 21 if the $L^{th}$ bit has not been reversed. In block 22, the reader reverses the last bit, $L^{th}$ bit, in its random number from 1 to 0 or vice versa, sets p=1 to denote that the Lth bit has been reversed, sets the number of counter i=1, and transmit that random number by returning to block 13 and repeating the blocks thereafter to block 20, again increasing the reader's random number by one if there are collisions, until no collisions occur, as described above.

Figure 2:
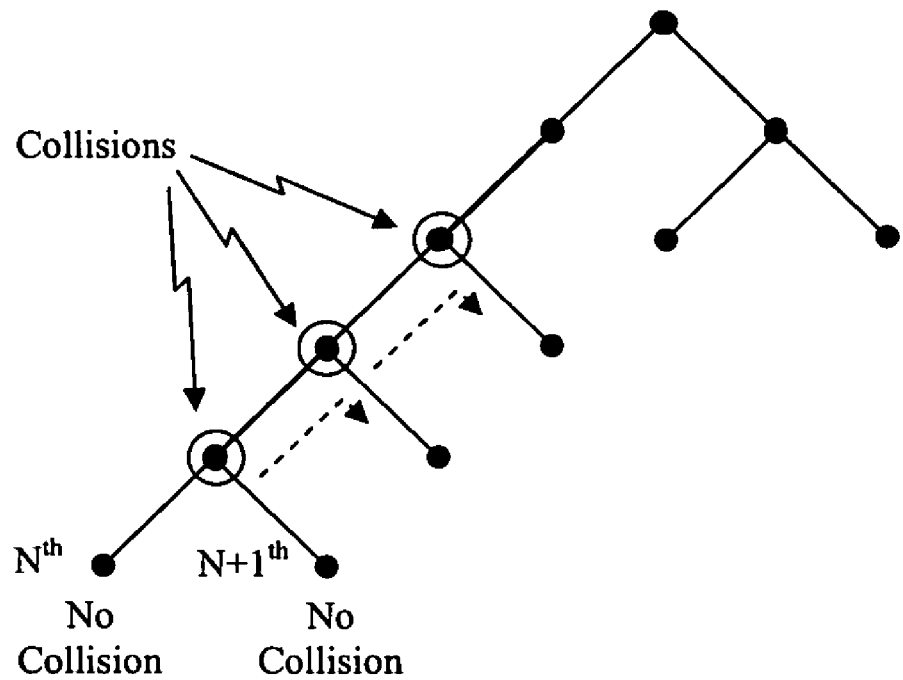
FIG. 2 is a schematic diagram of the method for resolving collision of the wireless transponders.

The method of the present invention is a tree search algorithm, and when all the branches of the tree have been found that have only one tag response (the Nth node), then the algorithm terminates, as shown in FIG. 2. According to the method, "at most one transponder response" can be verified by the repeated sending of the same random number as described above to increase the reliability. In the present invention, all the transponders in range can be inventoried for later one-to-one communication. Techniques can also be used so that the transponders only respond to authorized readers.

As an option, as discussed above, the transponders can be sent acknowledgements to stop their response to any inventorying commands.

If, in the very low probability scenario, a reader starts to encounter collisions at a certain branch of the tree and is unable to resolve the collision because the reader traces to the end of a sub-branch due to two or more transponders having the same random number, a reader can issue a command to freeze the first few number of bits of the random number identifying the branch before the start of the collisions and request that transponders within that colliding sub-branch regenerate their remaining bits in the random number. Transponders within the sub-branch can generate new and different random numbers for tie-breaking and allow a reader to continue its inventory process. Transponders in other branches will not be affected and do not need to generate new random numbers.

Figure 3:
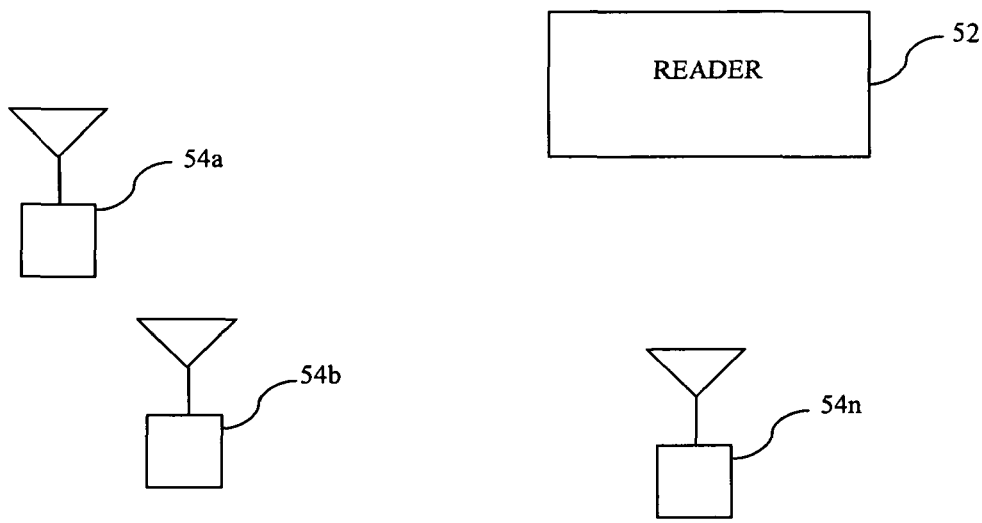
FIG. 3 is a schematic diagram of a system for inventorying wireless transponders providing anti-eavesdropping anti-collision.

FIG. 3 illustrates a schematic diagram of system for inventorying wireless transponders 50. Reader 52 transmits and receives communication with transponders 54a-54n and each of transponders 54a-54n transmits and receives communication with reader 52, as described above. Transponders 54a-54n can be RFID transponders.

An embodiment of collision detection is performed by the reader detecting in-band signal energy (typically by using a bandpass energy threshold detector called a carrier sense (CS) flag). The reader is unable to decode the message or detect CRC errors within the message. Other embodiments to detect collision can also be used for this invention.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A method for inventorying wireless transponders providing anti-eavesdropping and anti-collision comprising the steps of:
   (a) generating a reader random number at a reader;
   (b) transmitting at least a portion of said reader random number from said reader to one or more transponders; and
   (c) at each of said one or more transponders, transmitting a response to said reader when at least a portion of a transponder random number generated matches said received portion of said reader random number, said transponder random number being generated at a separate random number generator of said transponder,
   wherein a length of said reader random number is continuously updated according to the number of said one or more transponders that said reader wants to respond and whether the reader received a response.

2. The method of claim 1 wherein said reader transmits to more than one transponder and further comprising the step of: determining if there are any collisions of said responses.

3. The method of claim 2 wherein if any said collisions are determined further comprising the steps of:
   (d) increasing said portion of said reader random number transmitted from said reader in step (b); and
   repeating steps (b) through (d) until no said collisions occur.

4. The method of claim 3 further comprising the steps of:
   at said reader, reversing polarity of a last bit of said reader random number and repeating steps (b) through (d) until no collisions occur.

5. The method of claim 3 wherein if said collision is determined said transponders of said collision each generating a new transponder random number and repeating steps (b) through (d) until no collisions occur.

6. The method of claim 1 further comprising the step of storing said response at said reader.

7. The method of claim 1 wherein said response is said portion of said transponder random number which matches said received portion of said reader random number.

8. The method of claim 1 wherein said response is an acknowledgment signal.

9. The method of claim 1 further comprising the step of:
verifying the received response at said reader by repeating steps (a) through (c) a predetermined number of times.

10. The method of claim 1 wherein said reader can stop at least one of said transponders from responding when at least a portion of a transponder random number generated at said transponder matches said received portion of said reader random number.

11. A system for inventorying wireless transponders comprising:
a reader;
one or more transponders;
means for generating a reader random number at said reader;
means for transmitting at least a portion of said reader random number from said reader to said one or more transponders; and
at each of said one or more transponders, means for transmitting a response to said reader when at least a portion of a transponder random number generated at said transponder matches said received portion of said reader random number, said transponder random number being generated at a separate random number generator of said transponder,
wherein a length of said reader random number is continuously updated according to the number of said one or more transponders that said reader wants to respond and whether the reader received a response.

12. The system of claim 11 wherein said reader transmits to more than one transponder and further comprising:
collision means for determining if there are any collisions of said responses.

13. The system of claim 12 further comprising:
means for transmitting when said collisions means determines a collision at least a portion of said reader random number from said reader to said one or more transponders until no said collisions occur.

14. The system of claim 13 further comprising:
at said reader, means for reversing polarity of a last bit of said reader random number.

15. The system of claim 13 wherein if said collision is determined said transponders of said collision including means for generating a new transponder random number means for transmitting at least a portion of said reader random number from said reader to said one or more transponders until no collisions occur.

16. The system of claim 11 further comprising means for storing said response at said reader.

17. The system of claim 11 wherein said response is said portion of said transponder random number which matches said received portion of said reader random number.

18. The system of claim 11 wherein said response is an acknowledgment signal.

19. The system of claim 11 further comprising:
means for verifying the received response at said reader by retransmitting said reader random number a predetermined number of times.

20. The system of claim 11 wherein said reader can stop at least one of said transponders from responding when said at least a portion of a transponder random number generated at said transponder matches said received portion of said reader random number.

* * * * *